Dec. 5, 1939.  F. R. SHANLEY  2,182,706
AIRPLANE SAFETY DEVICE
Filed May 15, 1934  2 Sheets-Sheet 1

Francis R. Shanley
INVENTOR

BY Moncure B. Burg
ATTORNEY

Dec. 5, 1939.   F. R. SHANLEY   2,182,706
AIRPLANE SAFETY DEVICE
Filed May 15, 1934   2 Sheets-Sheet 2

Francis R. Shanley
INVENTOR
BY Monroe B. Berg
ATTORNEY

Patented Dec. 5, 1939

2,182,706

UNITED STATES PATENT OFFICE 2,182,706

AIRPLANE SAFETY DEVICE

Francis R. Shanley, Washington, D. C., assignor to the Government of the United States of America, as represented by the Secretary of the Navy Application May 15, 1934, Serial No. 725,815

9 Claims. (Cl. 177—311)

This application is filed as a continuation in part of my application Serial Number 620,033, filed June 29, 1932, and issued August 23, 1938, as U. S. Patent No. 2,128,169 for Safety indicators for airplanes.

My invention relates to aircraft and more particularly has reference to safety indicators therefor.

On account of the great difficulty with which the maximum loads acting on an airplane in flight are accurately predicted, it has been customary to incorporate high factors of safety in all airplane structures. This is always desirable, but the great value of additional payload in modern high speed transport airplanes makes it highly profitable to eliminate every useless pound of structural weight. This cannot be done without danger unless some safeguard is furnished the pilot and passengers. The purpose of this invention is to afford such a safeguard by indicating directly to the pilot the structural and aerodynamic limitations of any given airplane. It is, therefore, a valuable improvement for any type of airplane, as it is well known that it is practically impossible to build an airplane which cannot be broken in the air by violent maneuvers.

An important object of this invention is to facilitate the direct use of the results obtained from a stress analysis of the airplane structure and thereby bridge the wide gap which at present exists between the well-developed science of stress analysis and the very approximate methods of predicting the maximum loads likely to be imposed by the pilot.

Another important object of this invention is to furnish an indication of the approach or existence of a dangerous aerodynamic condition, commonly known as the stall.

A further object of my invention is to indicate the allowable values of positive or negative accelerations for any flight velocity.

Yet another object of this invention is to eliminate lag in the response of the indicator to a change in flight conditions.

Another object of my invention is to provide an adjustment for variations in the gross weight of the airplane.

Yet a further object of this invention is to eliminate moving parts and thereby to simplify the construction of the instrument, as well as to increase its sensitivity.

With these and other objects in view, which may be incident to my improvements, the invention consists in the parts and combination to be hereinafter set forth and claimed, with the understanding that the several necessary elements, comprising my invention, may be varied in construction, proportions, and arrangement, without departing from the spirit of the invention and the scope of the appended claims.

This invention comprehends an aircraft instrument in which the acceleration acting on the airplane in a direction substantially perpendicular to the lifting surfaces, and the dynamic pressure corresponding to the velocity of the airplane through the air, are combined in such a manner as to give an indication by means of a visual or an electrically-operated signal when any certain predetermined combinations of acceleration and dynamic pressure have been attained, particularly those combinations which represent dangerous structural loading or aerodynamic conditions.

In addition, this invention comprehends the utilization of a linear relationship between acceleration and dynamic pressure in a form of instrument in which the effects of acceleration and dynamic pressure are simultaneously applied to one contact point of an electric switch to cause a circuit to be closed by a very small movement of the mechanism upon the occurrence of certain linear combinations of acceleration and dynamic pressure.

Figure 8:
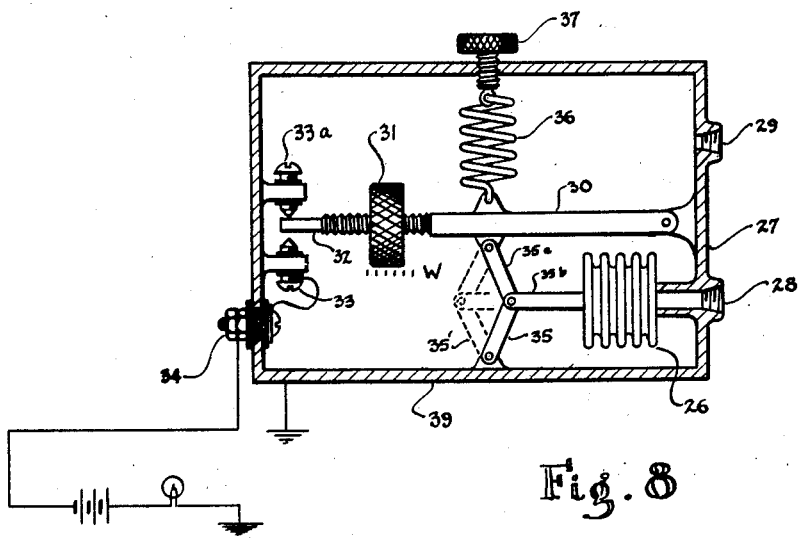

Figure 8 discloses a sensitive type of instrument for use with electrically-operated signals.

Figure 9:
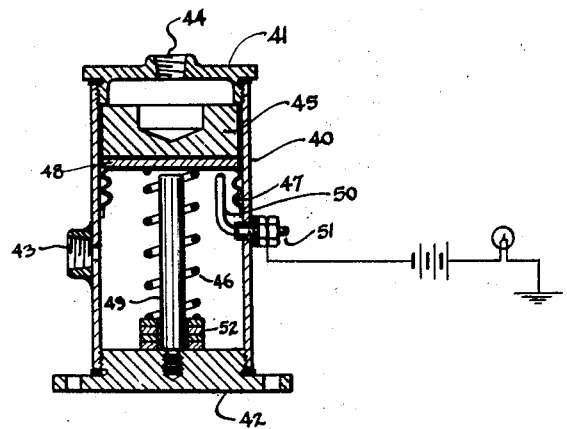

Figure 9 represents a section through a simplified form of the instrument, also of the sensitive type and employing an electrical contact.

Figure 10:
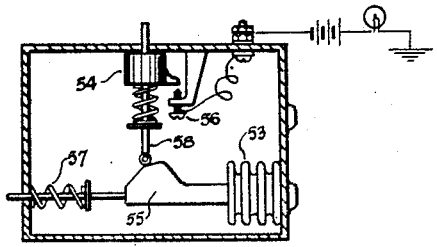

Figure 10 shows a section through a slightly modified form of the invention.

It is known that curves of allowable acceleration against dynamic pressure could be derived for each main structural member of an airplane. In certain types of airplane structures, such as externally braced monoplanes or biplanes, brace struts are employed which have a relatively low ultimate strength as long columns in compression. In such cases these struts would fail at certain combinations of negative (downward) acceleration and dynamic pressure. A typical curve for such a member is illustrated in Figure 1 as curve B.

It is important to note that when allowable accelerations are plotted against dynamic pressure, the resulting curves are straight lines, or very nearly so. This is due to the fact that the wing moment about a certain point on the wing chord is linearly dependent on the dynamic pressure and practically unaffected by all other variables. The allowable acceleration curves for the front and rear spars are, therefore, shown as straight lines in Figure 1, the line F representing a front spar and the line R representing a rear spar. This straight line relationship becomes of great importance in making possible a desirable form of instrument, as will be shown later.

It can easily be shown that there exists also a linear relationship between the values of acceleration and dynamic pressure required to produce a given lift coefficient for the wing. Therefore, if the maximum lift coefficient (at the burble point) is used in the basic equation, a straight line curve will be obtained which represents the well-known "stall" condition. As a practical example of this condition, if an airplane is required to make a sudden pull-out from a dive, it is important not to exceed the maximum lift coefficient, as the airflow over the wing would then break down and permit the airplane to "squash" and lose altitude or go into a spin. Obviously, if a dangerous structural load would be obtained before reaching the maximum lift coefficient, the latter would be of no importance, as the structural load curves would give the limiting acceleration. On the other hand, due to the breakdown of the airflow beyond the maximum lift coefficient, the theoretical structural load curves are meaningless beyond this point. Therefore, the "stall" curve can replace the structural load curves wherever the former shows lower values of acceleration.

Figure 1:
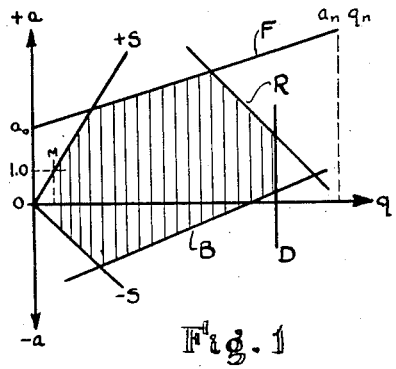
Figure 1 represents typical curves of allowable acceleration plotted against dynamic pressure for a specific airplane.

The above points are illustrated in Figure 1, in which curves +S and —S are plotted for the positive and negative stall. Positive stall occurs where the angle of attack is increased positively until the lift instead of increasing, actually decreases while negative stall is the reverse of this condition, that is to say in negative stall positive angles of attack are replaced by negative angles of attack and positive lift is replaced by negative lift. In other words, negative stall refers to the position of the airplane when stalled in inverted flight. The allowable acceleration curves for front and rear spars are shown as F and R, while that for the lift strut is indicated by the letter B. It is desirable to limit the airflow to a certain indicated diving velocity, which is, of course, represented by a vertical line D at the corresponding value of dynamic pressure. The "safe" area is contained within the various curves, as indicated by the shading in Figure 1. The dotted line M—M represents the dynamic pressure at the minimum flying speed and therefore forms the practical minimum limit for dynamic pressure. It will be noted that the negative acceleration curves will act as positive limits in inverted flight.

Figure 2:
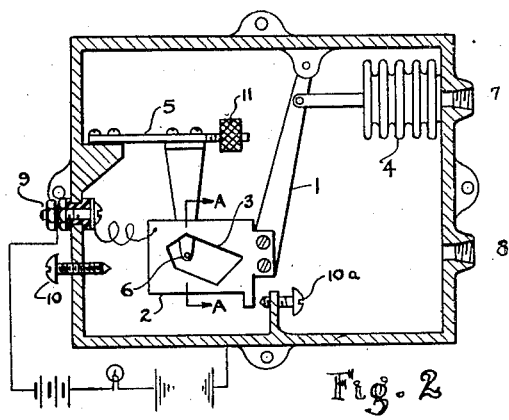
Figures 2 and 3 show a form of the invention adapted for use with an electrically-operated signal.

The apparatus illustrated in Figure 2 shows how the negative acceleration curves can be incorporated in the invention. It will be noted that a pendular support 1, for the insulated contact plate 2, is employed. Obviously, the shape of the curves 3 cut out of the contact plate must conform to the paths of motion employed for the moving parts of the instrument. In Figure 2, the essential parts are more or less diagrammatically indicated, 4 being the pressure responsive device, 5 the accelerometer (flat spring type), 6 the contact point and 7 and 8 the connections for the dynamic and static pressure leads from the Pitot tube. The electrical terminal 9 is connected to insulated plate 2 and, externally, to the live side of a circuit which passes through a suitable signal and is then grounded as indicated. Members 10 and 10a are adjustable stops which complete the circuit when either the maximum or minimum flying speeds are reached.

Adjustment to compensate for a change in airplane gross weight is effected by moving weight 11 to the left for a decrease in gross weight.

Figure 3:
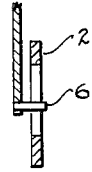

Figure 3 is a cross-section through A—A of Figure 2, showing how the contact member or index 6 is arranged with respect to the contact plate 2.

It is obvious that the instrument illustrated in Figure 2 will perform in the same manner as that illustrated in my previous application and will, in addition, give indications of the approach or existence of positive or negative stall conditions, as well as structurally dangerous negative accelerations. As in the instrument of the above mentioned application the instrument case can be arranged with a glass cover for visual use, or located out of sight, preferably near the center of gravity of the airplane, in which case the electrical signal system would be employed. In operation, the electrical circuit will be closed by contact of plate 2 with the index 6 or stops 10 or 11, depending on the value of the dynamic pressure acting on the pressure responsive device 4. The closing of the electric circuit actuates a suitable electrically operated signal, thereby warning the pilot that a dangerous condition has been reached.

Figure 4:
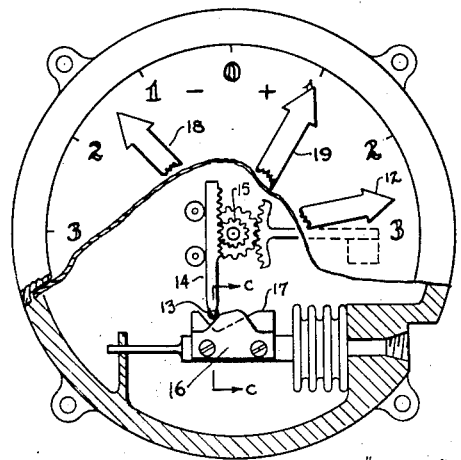
Figures 4 and 5 illustrate a form of the instrument employing a dial and pointers.

Figure 4 illustrates, by means of a partially sectioned plan view, how the instrument can be modified to cause a pointer or pointers to indicate directly on a dial the values of allowable acceleration as a function of dynamic pressure. Accelerometers of the dial type, which indicate the actual acceleration at any instant, are already in use. Therefore, a dial type of instrument indicating the allowable accelerations is desirable for use either as a separate instrument, or, preferably, in combination with the known type of dial accelerometer.

As illustrated in Figure 4, the variation of the allowable acceleration is simply translated with a rotary motion of the pointer 12, by means of a roller 13, rack 14, and pinion 15, operating on the cam-shaped plate 16, which, it will be appreciated, is basically the same as the contact plate described in the previously referred to application. In order to indicate also the allowable values of negative acceleration, a second cam-shaped plate 17 is used in conjunction with a second similar system of members operating the pointer 18. The plate 17 will obviously have a contour determined by the shape of the negative acceleration curves as shown in Figure 1.

In using this form of instrument in combination with a direct-reading dial type of accelerometer, the same dial would be used and the instrument would contain the usual accelerometer mechanism in addition to that illustrated in Figure 4. The actual acceleration would be given by a third pointer 19, as shown in Figure 4.

Figure 5:
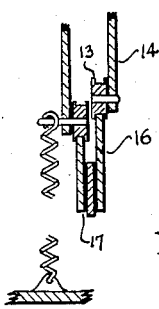

Figure 5 shows a cross section through C—C of Figure 4, illustrating how two separate cam-shaped plates and separate racks and rollers are employed.

Figure 6:
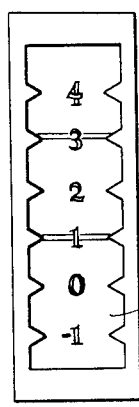
Figures 6 and 7 show a front elevation and a sectional side view of an instrument in which light beams are used as indices.
Figure 7:
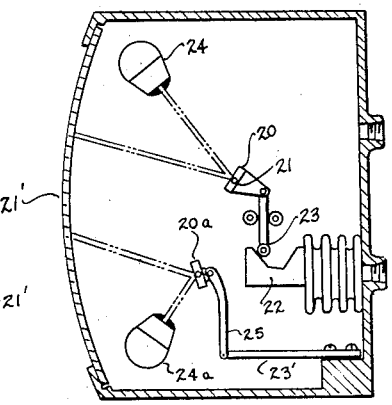

Figures 6 and 7 show, respectively, front and side elevations of an instrument which is the same in principle as that illustrated in Figure 4, except that the readings are obtained by means of light beams instead of pointers. Where great sensitivity and absence of lag are desired, the use of light beams as indices is common practice. The method of applying such usage to this invention is obvious from the drawings.

A mirror 20 is pivoted at 21 and is caused to rotate in accordance with a predetermined relationship between acceleration and dynamic pressure, the proper motion being obtained by means of the cam-shaped plate 22 and a suitable system of levers connected to the roller or cam-follower 23. A suitable source of light 24 causes a beam to be reflected from the mirror 20 to the translucent scale 21', thus indicating thereon, to a visible scale, the allowable value of acceleration. Another mirror 20a is similarly pivoted and is actuated by variations in the acceleration through a mechanism similar to that diagrammatically illustrated by the spring 23 and lever system 25. This causes a second light beam from source 24a to play on scale 21' and indicate the value of the actual acceleration. The acceleration-indicating mechanism as shown is not basically new, having been previously used in recording accelerometers. The remaining features of the instrument are similar to those previously described and require no further explanation. A separate mirror and mechanism for negative accelerations would, of course, be required, but this has already been shown in principle in Figure 4.

Figure 8 represents a form of this invention adapted to indicate the existence of accelerations which vary linearly with dynamic pressure. The pressure responsive device 26 is mounted on the casing 27 and furnished with a connection 28, to which the dynamic pressure line of a standard Pitot tube is connected. The static pressure line from the Pitot tube is connected with the interior of the instrument by means of connection 29. The arm 30 is pivotally mounted on casing 27 for motion in a vertical plane, as shown. A weight 31 is mounted on arm 30 in such a manner that its location along said arm can be varied for adjustment. Arm 30 has an indicating extension 32 which limits the motion of the arm to a small amount determined by the setting of the adjustable stops 33 and 33a, which are electrically insulated from the instrument proper. One of these stops or contact points is connected to the insulated binding post 34, as shown. The binding post 34 is, of course, connected to the electric signal circuit as indicated by the sketch of the wiring diagram.

The dynamic pressure responsive device 26, is connected to arm 30 by a suitable system of levers 35, 35a, and 35b in such a manner that the dynamic pressure will exert a force tending to cause the arm 30 to move. In the arrangement shown, the direction of the force acting on arm 30 can be reversed by changing the arrangement of levers 35 and 35a, as indicated by the dotted lines 35'.

A spring 36, is arranged so as to exert a force on arm 30. An adjusting nut 37 is furnished for adjusting the tension or compression in the spring.

The instrument illustrated in Figure 8 is mounted in the airplane so that the base 39 is approximately parallel to the plane of the main lifting surfaces. When an upward acceleration of the airplane takes place, the inertia of weight 31 and arm 30 tend to cause the arm to move downward with respect to the instrument and the arm will tend to rotate downward about its pivoted connection to the instrument case 27. In the particular arrangement shown, spring 36 is in tension. Therefore, it tends to prevent such arcuate movement and holds extension 32 against stop 33a. It is also apparent that the effect of the dynamic pressure acting on Sylphon 26 is to exert a force in the same direction as that from the spring. Therefore, the acceleration acting on the airplane must be great enough to overcome the combined forces from the spring and the dynamic pressure device before the arm 30 will move and cause a contact between extension 32 and stop 33.

Considering the curve F in Figure 1, the allowable acceleration when the dynamic pressure is zero is indicated to be $a_0$. Therefore the size and location of weight 31 and the size and adjustment of spring 36 must be such that an acceleration of $a_0$ will just cause the electrical contact to be made at stop 33 when there is no pressure acting on device 26. It will be noted that the allowable acceleration as given by curve F in Figure 1 increases linearly as the dynamic pressure $q$ increases. Likewise, in the instrument shown in Figure 8, the acceleration required to complete the electric contact will increase as the dynamic pressure acting on Sylphon 26 increases. Obviously it is only necessary to choose a suitable size and setting of the weight 31 and spring 36 so that the desired relationship is obtained between the dynamic pressure and the acceleration required to close the electric signal circuit.

It will be appreciated that a separate device such as illustrated in Figure 8 must be used for each separate curve on Figure 1. If the allowable acceleration decreases with increasing dynamic pressure, as shown by curve R, the arms 35 and 35a of Figure 8 must be arranged so that an increase in dynamic pressure will tend to offset the force produced by the spring. One method of doing this is indicated by the dotted lines 35'.

The instrument shown in Figure 8 can also be used in connection with negative accelerations such as indicated by line B in Figure 1. In this case the spring 36 would be in compression and the binding post 34 would be connected to stop 33a. The extension 32 would then be held against stop 33 until a critical negative acceleration occurred. With the dynamic pressure device connected as shown, the negative acceleration required to close the electric circuit would decrease as the dynamic pressure increased, which is the desired condition for curve B of Figure 1.

When the acceleration curve passes through zero at zero dynamic pressure, as shown by curve +S on Figure 1, the instrument shown in Figure 8 would be modified by relieving the tension in or removing the spring 36. This makes the instrument, in effect, a stall indicator. The negative stall would be taken care of in the same manner, but the arms 35 and 35a would be relocated as indicated by the dotted lines 35'.

The adjustment provided for weight 31 and the use of the pivoted arm 30 permits the instrument to be calibrated for variable airplane gross weights. This will be apparent when it is considered that the acceleration is being used as a measure of the total air load acting on the wings. Obviously, if the weight or mass of the airplane were decreased, a given total wing load would cause a greater acceleration and thereby cause the instrument to indicate a dangerous condition slightly before the condition actually occurred. This can be compensated for by moving the weight 31 toward the pivoted end of arm 30, so that a greater acceleration will be required to overcome the resistance of spring 36 and the dynamic pressure device 26. Where large variations in gross weight are common, a calibrating scale in terms of the airplane weight is provided, as indicated just below weight 31 in Figure 8.

As variations in gross weight need not be accounted for on most airplanes, a simplified form of the device has been developed, as shown in Figure 9. In this case the instrument casing 40 is made from a round tube, the ends of which are tightly closed by caps 41 and 42. Connections for the Pitot tube lines are provided as shown by 43 and 44. A weight 45 is slidably mounted in the casing 40 and is supported by spring 46 and by the diaphragm 47, which is permanently soldered or welded to casing 40 to form an air-tight joint. Plate 48 is attached to diaphragm 47 to prevent its distortion under pressure. A stop 49 is provided to limit the motion of the diaphragm to a small amount. An electrical contact point 50 is connected to the insulated binding post 51. Removable washers 52 are inserted below spring 46 to provide adjustment of the compression in the spring.

From the preceding description of the operation of the form of instrument illustrated in Figure 8, it will be appreciated that the instrument shown in Figure 9 will operate in substantially the same manner. To accommodate a curve such as F in Figure 1, the dynamic pressure line from the Pitot tube would be connected to nipple 43 and the static pressure line to connection 44. For a curve such as R in Figure 1, these connections would be reversed. Negative accelerations would be taken care of by mounting the instrument upside down. When used as a stall indicator the spring 46 would be removed. Weight 45 will in general have a different mass for different types of curves. This can be accomplished by a suitable choice of material for the weight and by counterboring as shown.

In using instruments of the types shown in Figures 8 and 9, a separate instrument is required for each separate curve desired to be accounted for, such as those in Figure 1. A single electrical signal or warning device such as a light or buzzer can be connected to all instruments in parallel so that the first instrument to make contact will close the circuit. If desired, however, separate signals can be used so that the pilot will be aware of the nature of the danger being indicated. For instance, the instrument used in connection with curve +S in Figure 1 can be separately connected to a light of a certain color which will indicate to the pilot that a stalled condition is being approached. It is also possible to use two instruments for each basic curve, one being adjusted to indicate the existence of a certain percentage of the maximum allowable acceleration, the other being used to indicate that the maximum allowable value has been reached. The former indication would then serve as a caution and the latter would act as a final danger signal.

In certain cases it is desirable to combine the essential features of the original form of the invention shown in my above mentioned application with the sensitive features of the types shown in Figures 8 and 9. This is accomplished in an instrument such as that diagrammatically illustrated in Figure 10. The essential features of this type of instrument are the pressure-responsive device 53, weight 54, cam-shaped plate 55, and electric contact 56. The plate 55 is moved against spring 57 by the action of the dynamic pressure. This causes the cam follower 58 to compress or extend spring 59 acting on weight 54, thereby varying the resistance against which the acceleration must act to close the electric circuit at contact 56. Obviously this form of instrument eliminates the necessity for a separate device for each straight-line curve and will take care of any desired shape of acceleration-dynamic pressure curve. The advantages of the sensitive type are retained in the acceleration responsive part of the mechanism, thereby eliminating lag and vibration effects. On the other hand, variations in dynamic pressure are always comparatively gradual, so that the motion required for plate 55 is not objectionable.

From the foregoing description, it will be appreciated that I have provided a novel instrument for indicating the existence of any predetermined relationship between acceleration acting on the airplane and the dynamic pressure corresponding to the velocity of the airplane through the air. The importance of this invention as an aid to safe air transportation is at once apparent, as it can be used not only to warn the pilot against developing unsafe loads in the airplane structure but also to indicate the approach of dangerous attitudes of flight leading to loss of control. The question of the effect of variations in air density with altitude is automatically solved by this invention, as the dynamic pressure, being of a more basic nature than the airplane velocity, includes the combined effects of air density and velocity. Furthermore, both acceleration and dynamic pressure are easily measurable, the latter measurement being in fact already available on practically every airplane by simply connecting the instrument to the pressure lines from the Pitot tube to the airspeed indicator.

The use of an electric signal relieves the pilot of the burden of watching an additional instrument during maneuvers in which dangerous conditions are likely to occur. The instrument can be used, if desired, to close a buzzer circuit connected with the pilot's head phones or with a loud speaker, thereby eliminating any necessity for watching for a signal.

The particular constructional features illustrated in Figures 8, 9 and 10 greatly increases the sensitivity of the instrument and eliminate vibratory effects and wear. In addition, they provide a simple method of construction which permits the instrument to be cheaply, yet ruggedly, manufactured, a feature which is of great importance in aircraft instruments.

Recent developments in aeronautical research indicate the existence of a critical relationship between acceleration and dynamic pressure with respect to wing flutter. It is, therefore, probable that the range of usefulness of this invention will be extended to the prediction of and warning against the occurrence of wing flutter, a phenomenon which is particularly dangerous and which is likely to occur at high speeds on certain types of airplanes.

The use of the instrument as a simple, foolproof, stall indicator is obviously important, in itself, particularly since the true stall condition at any velocity can be anticipated. This feature is of great value in connection with airplanes which are to be dived to high speeds and then pulled out with a minimum loss of altitude.

It should be particularly noted that this instrument does not confine itself to an indication of "stalling speed," as commonly understood.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. An aircraft instrument comprising indicating means adapted to a small change in position and a spring restraining said indicating means against free downward motion, actuating means responsive to acceleration, other actuating means responsive to dynamic pressure, both of said actuating means being mechanically connected to said indicating means by a leverage system in such a way that the actuating force due to acceleration will react to overcome the resistance of said spring and force due to dynamic pressure to cause a change of position of said indicating means.

2. An aircraft instrument as claimed in claim 1, characterized by the fact that the indicating means comprises an electric switch forming a part of an electric signal circuit.

3. An aircraft instrument as claimed in claim 1, characterized by the fact that means are provided for adjusting the tension or compression in the spring.

4. An aircraft instrument as claimed in claim 1 in which the acceleration-responsive actuating means comprises a pivoted arm supporting a weight, the position of said weight along said arm being adjustable.

5. An aircraft instrument comprising indicating means responsive to a small change in position and a spring restraining said indicating means against free motion, actuating means responsive to acceleration and acting on said indicating means, other actuating means operated by dynamic pressure and means connecting said dynamic pressure actuating means with the actuating means responsive to acceleration so that the force exerted by said spring is controlled in accordance with a predetermined relationship between acceleration and dynamic pressure.

6. An instrument as claimed in claim 5, characterized by the fact that the indicating means comprises an electric switch forming part of an electric signal circuit.

7. An aircraft instrument comprising a casing, a weight movable for a small distance between an upper and a lower stop in said casing, means for causing a pressure differential to be applied to said weight thereby tending to force it against one of said stops, means for mounting said casing in an airplane so that acceleration acting on the airplane will tend to force said weight against the lower stop, an electric switch operated by a small motion of said weight, a spring acting against said weight and tending to hold it against said upper stop, the closing of said switch being accomplished by the action of acceleration against the differential pressure and said spring.

8. An instrument as claimed in claim 7, characterized by the fact that means are provided for varying the compression in the spring.

9. An aircraft instrument comprising a casing, a weight movable for a small distance between an upper and a lower stop in said casing, means for causing a pressure differential to be applied to said weight thereby tending to force it against the upper stop, means for mounting said casing in an airplane so that acceleration acting on the airplane will tend to force said weight against the lower stop, an electric switch operated by a small motion of said weight, the closing of said switch being accomplished by action of acceleration against the differential pressure, thereby adapting the instrument as a stall indicator for aircraft.

FRANCIS R. SHANLEY.